United States Patent
Zeng et al.

(10) Patent No.: US 10,511,176 B2
(45) Date of Patent: Dec. 17, 2019

(54) POWER CONVERTER

(71) Applicant: DELTA ELECTRONICS, INC., Taoyuan (CN)

(72) Inventors: Jianhong Zeng, Taoyuan (CN); Peiqing Hu, Taoyuan (CN); Haoyi Ye, Taoyuan (CN); Yan Chen, Taoyuan (CN); Jiale Dai, Taoyuan (CN); Ziying Zhou, Taoyuan (CN)

(73) Assignee: Delta Electronics, Inc., Taoyuan, Taiwan (CN)

( * ) Notice: Subject to any disclaimer, the term of this patent is extended or adjusted under 35 U.S.C. 154(b) by 449 days.

(21) Appl. No.: 15/134,478

(22) Filed: Apr. 21, 2016

(65) Prior Publication Data

US 2017/0012442 A1 Jan. 12, 2017

(30) Foreign Application Priority Data

Jul. 6, 2015 (CN) .......................... 2015 1 0390600

(51) Int. Cl.
| | | |
|---|---|---|
| H02J 1/00 | (2006.01) | |
| H02J 3/14 | (2006.01) | |
| H02J 5/00 | (2016.01) | |
| H02M 1/14 | (2006.01) | |

(52) U.S. Cl.
CPC ................. *H02J 5/00* (2013.01); *H02M 1/14* (2013.01)

(58) Field of Classification Search
CPC ........ H02J 5/00; H02M 1/14; H02M 3/33592; H02M 3/337; H02M 2001/0048; H02M 2001/008; Y02B 70/1475; Y02B 70/1491
USPC ........................................................ 307/31
See application file for complete search history.

(56) References Cited

U.S. PATENT DOCUMENTS

| | | | |
|---|---|---|---|
| 7,068,515 B2 | 6/2006 | Harris et al. | |
| 8,587,963 B2 | 11/2013 | Nan et al. | |
| 2002/0131258 A1 | 9/2002 | Inoue et al. | |
| 2005/0189566 A1 | 9/2005 | Matsumoto et al. | |
| 2007/0024369 A1* | 2/2007 | Cao .......................... | H03F 3/195 330/269 |

(Continued)

FOREIGN PATENT DOCUMENTS

| | | |
|---|---|---|
| CN | 1684350 A | 10/2005 |
| CN | 101465743 A | 6/2009 |

(Continued)

OTHER PUBLICATIONS

1st OA issued Oct. 13, 2016 by the TW Office.
The Chinese 1OA issued by SIPO dated May 15, 2018.
The US1OA dated Jan. 17,2017 by the USPTO.
The US2OA dated Jul. 27,2017 by the USPTO.

*Primary Examiner* — Rexford N Barnie
*Assistant Examiner* — Toan T Vu
(74) *Attorney, Agent, or Firm* — Yunling Ren

(57) ABSTRACT

The present disclosure provides a power converter, including: a pre-stage circuit, configured to receive an input voltage and convert the input voltage to a bus voltage; and plurality of post-stage circuits, connected in parallel to an output terminal of the pre-stage circuit, and configured to receive the bus voltage from the pre-stage circuit and each converts the bus voltage to an output voltage. The power converter provided by the present disclosure can effectively solve the problems of isolation and the wide range of operating voltage, and can take both of high efficiency and high power density into consideration.

20 Claims, 24 Drawing Sheets

(56) References Cited

U.S. PATENT DOCUMENTS

| | | |
|---|---|---|
| 2008/0101025 A1 | 5/2008 | Harris et al. |
| 2008/0231233 A1* | 9/2008 | Thornton ................ G06F 1/263 320/137 |
| 2010/0093132 A1 | 4/2010 | Elbanhawy et al. |
| 2011/0080102 A1* | 4/2011 | Ge ..................... H05B 33/0815 315/200 R |
| 2011/0157947 A1* | 6/2011 | Lo ..................... H02M 3/33561 363/127 |
| 2012/0173892 A1 | 7/2012 | Tong et al. |
| 2013/0229841 A1* | 9/2013 | Giuliano ................ H02M 3/07 363/60 |
| 2014/0306674 A1 | 10/2014 | Kondou et al. |
| 2015/0070940 A1* | 3/2015 | Sato ................... H02M 3/1584 363/17 |
| 2016/0013719 A1* | 1/2016 | Babazadeh ........... H02M 3/157 323/271 |
| 2016/0156201 A1* | 6/2016 | Park ................... H01M 10/425 320/134 |
| 2016/0160828 A1 | 6/2016 | Betscher et al. |

FOREIGN PATENT DOCUMENTS

| | | |
|---|---|---|
| CN | 101651031 A | 2/2010 |
| CN | 101777844 A | 7/2010 |
| CN | 101895191 A | 11/2010 |
| CN | 101777844 B | 4/2012 |
| CN | 103107777 A | 5/2013 |
| CN | 103872919 A | 6/2014 |
| CN | 104038070 A | 9/2014 |
| CN | 104111715 A | 10/2014 |
| CN | 104253536 A | 12/2014 |
| CN | 104638944 A | 5/2015 |
| CN | 105449987 A | 3/2016 |
| CN | 105790586 A | 7/2016 |
| CN | 106026350 A | 10/2016 |
| GB | 2399684 A | 9/2004 |
| TW | M253836 U | 12/2004 |
| TW | 200534570 A | 10/2005 |
| TW | 201505345 A | 2/2015 |

\* cited by examiner

POWER CONVERTER

CROSS REFERENCE

This application is based upon and claims priority to Chinese Patent Application No. 201510390600.8, filed on Jul. 6, 2015, the entire contents thereof are incorporated herein by reference.

TECHNICAL FIELD

The present disclosure relates to the field of a power module technology, and more particularly, to a power converter.

BACKGROUND

With growth of people's demand for an ever intelligent lifestyle, demand for high capacity of data processing is also growing. Energy consumption in data processing has reached about hundreds of billions of or even trillions of kilowatts-hour each year, and a large data center can occupy an area up to tens of thousands of square meters. Accordingly, high efficiency and high power density are significant indicators of a health development of the data center industry.

A critical unit of the data center is a server, which is typically equipped with a mainboard composed of data processing chips (such as a CPU, chipsets, a memory or the like), their power supplies and necessary peripheral components. With increase of the processing capacity per volume unit of a server, the number and the integration level of the processing chips are also increasing, resulting in enlargement of occupied space and increase of power consumption. Accordingly, the power supply (also referred to as a mainboard power supply since it is on the same mainboard with the data processing chips) for the chips is excepted to have higher efficiency, higher power density and smaller volume, conducive to the energy saving and reduction of the occupied resource for the entire server or even of the entire data center.

An input power supply provided for digital chip is typically of a low voltage and a large current. In order to reduce a loss due to wiring between the input power supply and the digital chip, the input power supply is required to directly provide supply power for the digital chip. In other words, it is desirable to dispose the input power supply to the digital chip as closely as possible. The input power supplies directly providing supply power for the digital chips are referred to as point of the loads (POL), and the POL are provided supply powers by other power supplies.

Currently, an input voltage of a POL typically is 12V. However, in case where a total power of the server is relatively high and the input voltage of the POL is relatively low, the input current of the POL will be relatively large. For example, if the total power of the server is 1200 W and the input voltage of the POL is 12V, the input current of the POL will be as high as 100 A. The input voltage of the POL is so high that the occupied resource and the loss caused by it on the mainboard become ever more noticeable. If the input voltage of the POL is increased to 48V, for example, the input current of the POL will be reduced significantly, effectively solving the problem of the occupied resource and the loss caused by the input voltage of the POL.

If the input voltage of the POL is 48V, compared with the traditional input voltage of 12V, the value of the voltage is increased by 4 times. Although the POL having the traditional input voltage of 12V is typically implemented with a BUCK circuit, it is difficult to implement the POL having the input voltage of 48V with a BUCK circuit since the duty cycle is too small. In order to solve the above problem, in the related art, a power supply configuration is proposed as shown in FIG. 1. In FIG. 1, an input terminal of a data processing mainboard 1 is connected in parallel to an input voltage Vin. The input voltage Vin is an input voltage Vin of the data processing mainboard 1, which is 48V. Converters 48V-Vo1, 48V-Vo2 and 48V-Von each receives the input voltage Vin, converts the input voltage Vin to a respective output voltage, and provide it for a corresponding load (a load 1, a load 2 and a load n as shown in FIG. 1).

The converters 48V-Vo1, 48V-Vo2 and 48V-Von in FIG. 1 each can be simply implemented with a single-stage isolation converter. FIG. 2 shows a circuit diagram of the converter in FIG. 1. An input voltage of 48V (48V+ and 48V− as shown in the figure) is converted by the single-stage isolation converter to be output an output voltage Vo (VO+ and VO− as shown in the figure) for the load. The single-stage isolation converter can be a pulse width modulation (PWM) converter such as a forward converter/a flyback converter, or can also be a pulse frequency modulation resonant converter such as a LLC/LC/LCL or the like.

Since the digital chip such as the CPU has a wide range of operating voltage, the single-stage isolation converter typically achieves both of the critical indicators of wide operating range and isolation at the expense of efficiency and power density. In addition, the single-stage isolation converter having the input voltage of 48V is of a relatively complex configuration. Also, the single-stage isolation converter having the input voltage of 48V has a limited power if it directly supplies power to a single load, and thus is not suitable for parallel multiplex to achieve reduced capacitor volume and improved light load efficiency. Accordingly, it is hardly possible for the single-stage isolation converter having the input voltage of 48V to meet the future demand.

SUMMARY

The present disclosure provides a novel power converter, which can effectively solve the problems of isolation and the wide range of operating voltage, and can take both of high efficiency and high power density into consideration, to meet the requirement of future point power supplies.

The present disclosure provides a power converter, including: a pre-stage circuit and a plurality of post-stage circuits. The pre-stage circuit is configured to receive an input voltage and convert the input voltage to a bus voltage; and the plurality of post-stage circuits are connected in parallel to an output terminal of the pre-stage circuit, and configured to receive the bus voltage from the pre-stage circuit and each converts the bus voltage to an output voltage.

The power converter provided by the present disclosure can effectively solve the problems of isolation and the wide range of operating voltage, and can take both of high efficiency and high power density into consideration.

DETAILED DESCRIPTION

Figure 1:
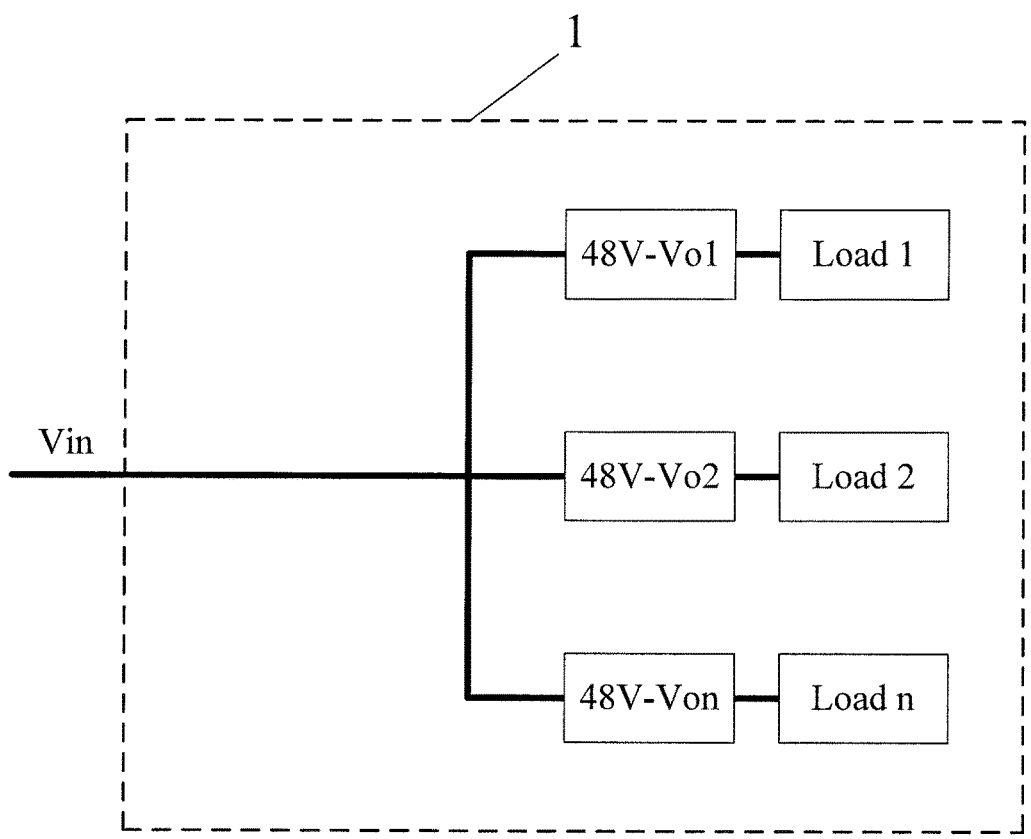
FIG. 1 is a schematic diagram of a power supply in the related art.
Figure 2:
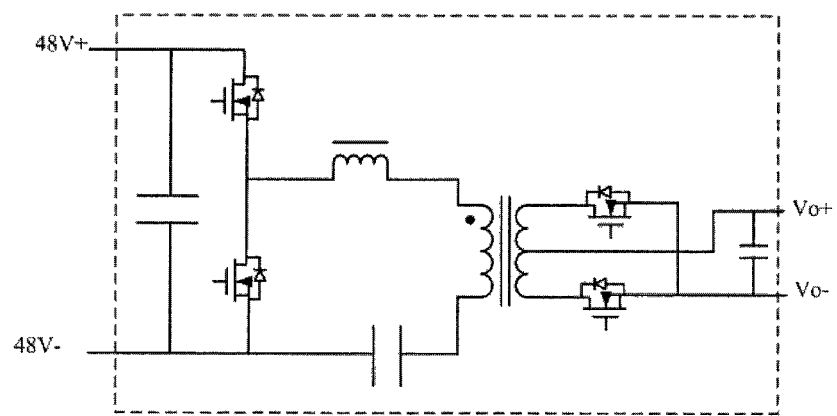
FIG. 2 is a circuit diagram of the converter in FIG. 1.

Hereinafter, the present disclosure will be further described in detail, with reference to accompanying drawings and embodiments. It shall be appreciated that the specific embodiments described herein are merely for illustration of the present disclosure rather than limitation to the present disclosure. In addition, it should be noted that only a part of the components which is related to the present disclosure, not all of the components, is shown in the drawings for the convenience of description.

A First Embodiment

The present embodiment provides a power converter including a two-stage circuit, which includes a pre-stage circuit and a post-stage circuit. The pre-stage circuit is configured to receive an input voltage, and convert the received input voltage to a bus voltage and output a bus voltage. The post-stage circuit can be a plurality of post-stage circuits connected in parallel to an output terminal of the pre-stage circuit. Each of the post-stage circuits is configured to receive the bus voltage output by the pre-stage circuit, convert the bus voltage to an output voltage and provide it for a load connected to an output terminal of the post-stage circuit.

Next, the power converter of the present embodiment will be described with reference to specific examples.

Figure 3A:
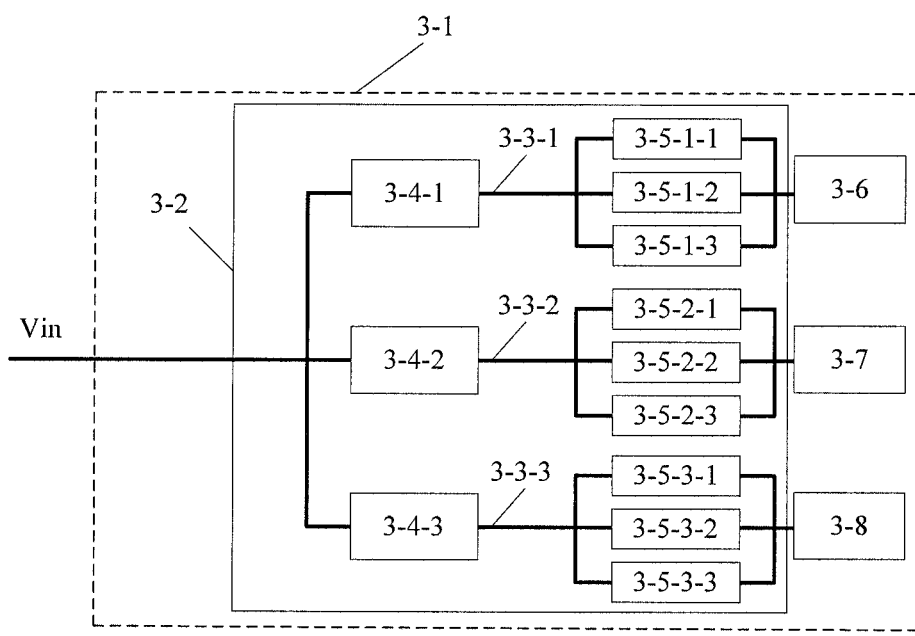
FIG. 3A is a schematic diagram of a power converter according to an embodiment of the present disclosure.

FIG. 3A is a schematic diagram of a power converter provided by an embodiment of the present disclosure. As shown in FIG. 3A, a power converter 3-2 includes a plurality of pre-stage circuits and a plurality of post-stage circuits. Input terminals of the pre-stage circuits 3-4-1, 3-4-2 and 3-4-3 are connected in parallel, and each of the pre-stage circuits 3-4-1, 3-4-2 and 3-4-3 is configured to convert the received input voltage Vin to a bus voltage 3-3-1, 3-3-2 and 3-3-3 respectively. Input terminals of the post-stage circuits 3-5-1-1, 3-5-1-2 and 3-5-1-3 of the power converter 3-2 are connected in parallel to an output terminal of the pre-stage circuit 3-4-1, and each of the post-stage circuits 3-5-1-1, 3-5-1-2 and 3-5-1-3 is configured to convert the received bus voltage 3-3-1 to a respective output voltage. Output terminals of the post-stage circuits 3-5-1-1, 3-5-1-2 and 3-5-1-3 are connected in parallel, and a load 3-6 is connected to the output terminals of the post-stage circuits 3-5-1-1, 3-5-1-2 and 3-5-1-3. Thus, the post-stage circuits 3-5-1-1, 3-5-1-2 and 3-5-1-3 provide an output voltage for the load 3-6 collectively. Input terminals of the post-stage circuits 3-5-2-1, 3-5-2-2 and 3-5-2-3 of the power converter 3-2 are connected in parallel to an output terminal of the pre-stage circuit 3-4-2, and each of the post-stage circuits 3-5-2-1, 3-5-2-2 and 3-5-2-3 is configured to convert the received bus voltage 3-3-2 to a respective output voltage. Output terminals of the post-stage circuits 3-5-2-1, 3-5-2-2 and 3-5-2-3 are connected in parallel, and a load 3-7 is connected to the output terminals of the post-stage circuits 3-5-2-1, 3-5-2-2 and 3-5-2-3. Thus, the post-stage circuits 3-5-2-1, 3-5-2-2 and 3-5-2-3 provide an output voltage for the load 3-7 collectively. Input terminals of the post-stage circuits 3-5-3-1, 3-5-3-2 and 3-5-3-3 of the power converter 3-2 are connected in parallel to an output terminal of the pre-stage circuit 3-4-3, and each of the post-stage circuits 3-5-3-1, 3-5-3-2 and 3-5-3-3 is configured to convert the received bus voltage 3-3-3 to a respective output voltage. Output terminals of the post-stage circuits 3-5-3-1, 3-5-3-2 and 3-5-3-3 are connected in parallel, and a load 3-8 is connected to the output terminals of the post-stage circuits 3-5-3-1, 3-5-3-2 and 3-5-3-3. Thus, the post-stage circuits 3-5-3-1, 3-5-3-2 and 3-5-3-3 provide an output voltage for the load 3-8 collectively. In the present embodiment, a load can be directly connected to an output terminal of a separate post-stage circuit, and be provided with an output voltage by the post-stage circuit. Wherein, the pre-stage circuit can be a PWM circuit (such as a full-bridge circuit, a half-bridge circuit, a forward circuit, a flyback circuit or the like) or a resonant circuit (such as a LLC circuit, a LC circuit or the like), and can be an isolation circuit or a non-isolation circuit. The post-stage circuit can be a non-isolation circuit, such as a BUCK circuit, a boost circuit, a BUCK-boost circuit or the like. The advantage that the converter includes a two-stage circuit lies in that the bus voltage can be determined by the efficiency and the power density of the power converter 3-2.

In the present embodiment, a data processing mainboard 3-1 further includes data processing chips (such as a CPU, a memory and the like), peripheral electronic components and a power converter. The power converter 3-2 receives an input voltage Vin of 48V, converts the input voltage to a plurality of output voltages, to provide supply power for the data processing chips and the peripheral electronic components. In the present embodiment, the power converter 3-2 is directly disposed in proximity to loads with relatively large power consumption on the data processing mainboard 3-1, and the traditional 12V of the input voltage of the power converter 3-2 is replaced by 48V. The advantage lies in that by increasing the input voltage Vin of the power converter 3-2 from the traditional 12V to 48V, the input current of the power converter 3-2 can be reduced by 4 times, and in turn, power consumption caused by transmission through the output wires in the power converter 3-2 can be reduced to ¹⁄₁₆ of the traditional power consumption. Also, the occupied resource of the power converter 3-2 on the data processing mainboard 3-1 can be significantly reduced.

In the present embodiment, the power converter 3-2 is composed of a two-stage circuit. The input terminals of the pre-stage circuits 3-4-1, 3-4-2 and 3-4-3 are connected in parallel, for receiving the input voltage Vin respectively and converting the input voltage Vin to a bus voltage. For example, the input voltage Vin is DC 48V, then the pre-stage circuits 3-4-1, 3-4-2 and 3-4-3 respectively receives the input voltage Vin of 48V and convert the input voltage Vin of 48V to a bus voltage of 5V. Each of the post-stage circuits 3-5-1-1, 3-5-1-2, 3-5-1-3, 3-5-2-1, 3-5-2-2, 3-5-2-3, 3-5-3-1, 3-5-3-2 and 3-5-3-3 converts the bus voltage of 5V to a respective output voltage. Wherein, the input terminals of the post-stage circuits 3-5-1-1, 3-5-1-2 and 3-5-1-3 are connected in parallel to the output terminal of the pre-stage circuit 3-4-1. The output terminals of the post-stage circuits 3-5-1-1, 3-5-1-2 and 3-5-1-3 are connected in parallel, for respectively converting the received bus voltage of 5V to an output voltage and providing the output voltage to the load 3-6. The input terminals of the post-stage circuits 3-5-2-1, 3-5-2-2 and 3-5-2-3 are connected in parallel to the output terminal of the pre-stage circuit 3-4-2. The output terminals of the post-stage circuits 3-5-2-1, 3-5-2-2 and 3-5-2-3 are connected in parallel, for respectively converting the received bus voltage of 5V to an output voltage and providing the output voltage to the load 3-7. The input terminals of the post-stage circuits 3-5-3-1, 3-5-3-2 and 3-5-3-3 are connected in parallel to the output terminal of the pre-stage circuit 3-4-3. The output terminals of the post-stage circuits 3-5-3-1, 3-5-3-2 and 3-5-3-3 are connected in parallel, for respectively converting the received bus voltage of 5V to an output voltage and providing the output voltage to the load 3-8. Since the plurality of post-stage circuits is connected in parallel to collectively output the output voltage, the power converter 3-2 can have the advantage of reduced capacitor volume and improved light load efficiency.

In other embodiments, the input voltage Vin can also be DC 400V or an AC voltage.

In the present embodiment, the bus voltage outputted by the pre-stage circuits 3-4-1, 3-4-2 and 3-4-3 is a internal bus voltage of the power converter 3-2. The bus voltage can be determined by the efficiency and the power density of the power converter 3-2. Since the voltages of the loads on the data processing mainboard 3-1 are mainly equal to or less than 2V, the internal bus voltage of the power converter 3-2 can be set as 2-8V, for example about 5V, taking both of the dynamic response requirement on the post-stage circuit of the power converter 3-2 and the overall efficiency of the power converter 3-2 into consideration.

Since the bus voltage is mainly applied inside the power converter, the bus voltage can be freely set to a voltage range which can improve the efficiency of the power converter as desired. Since the bus voltage can be lower than the input voltage (such as 12V) of the traditional single-stage isolation converter, switching loss of the post-stage circuit can be significantly reduced. For example, if the bus voltage is reduced from 12V to 6V, the switching loss of the post-stage circuit will be reduced by more than a half. For a power converter in which the original switching loss is dominant, the efficiency of the power converter can be significantly improved. For example, the efficiency can be improved by more than 1%. The lower bus voltage can allow the post-stage circuit to be a MOSFET with a much lower voltage. For example, the MOSFET with 25V Vds can be replaced by a MOSFET with 16V Vds. Thus, not only the switching loss can be further reduced, but also the conduction loss of the switch can be significantly reduced and the efficiency of the post-stage circuit can be significantly improved, by 1% for example. The lower bus voltage is also conducive to improve the operating frequency of the post-stage circuit and reduce the volume of the post-stage circuit. The lower bus voltage and the MOSFET with a lower voltage in the power converter can improve the overall efficiency of the power converter by more than 2%. The energy saving effect is noticeable and the cost of heat treatment can also be lowered. In addition, the switching frequency of the post-stage circuit can be increased from the traditional hundreds of KHZ to several MHZ or even to tens of MHZ, which significantly reduces the volume of passive devices (such as magnetic elements or capacitors) in the post-stage circuit, increases the power density of the power converter (for example, from the traditional 200 W/inch³ to more than 300 W/inch³), and allows the power converter to be suitable for more application environments.

Figure 3B:
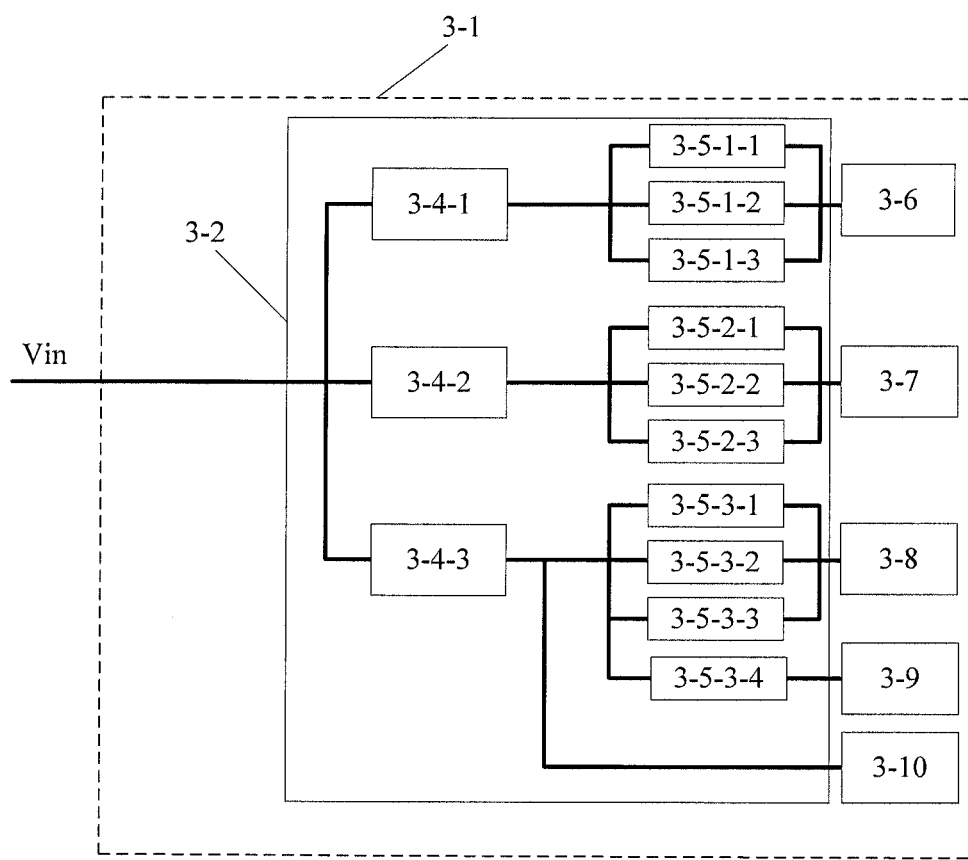
FIG. 3B is a schematic diagram of modification of the power converter in FIG. 3A.

FIG. 3B shows a schematic diagram of modification of the power converter in FIG. 3A. Unlike the power converter in FIG. 3A, the input terminals of the post-stage circuits 3-5-3-1, 3-5-3-2, 3-5-3-3 and 3-5-3-4 are connected in parallel to the output terminal of the pre-stage circuit 3-4-3, for receiving the bus voltage outputted by the pre-stage circuit 3-4-3. The output terminals of the post-stage circuits 3-5-3-1, 3-5-3-2 and 3-5-3-3 are connected in parallel to provide an output voltage for the load 3-8 collectively, and the post-stage circuit 3-5-3-4 provides an output voltage for a load 3-9. An input terminal of a load 3-10 is connected to the output terminal of the pre-stage circuit 3-4-3, and receives the bus voltage outputted from the pre-stage circuit 3-4-3. In other embodiments, the load 3-10 can also be connected to the output terminal of other pre-stage circuits.

Figure 3C:
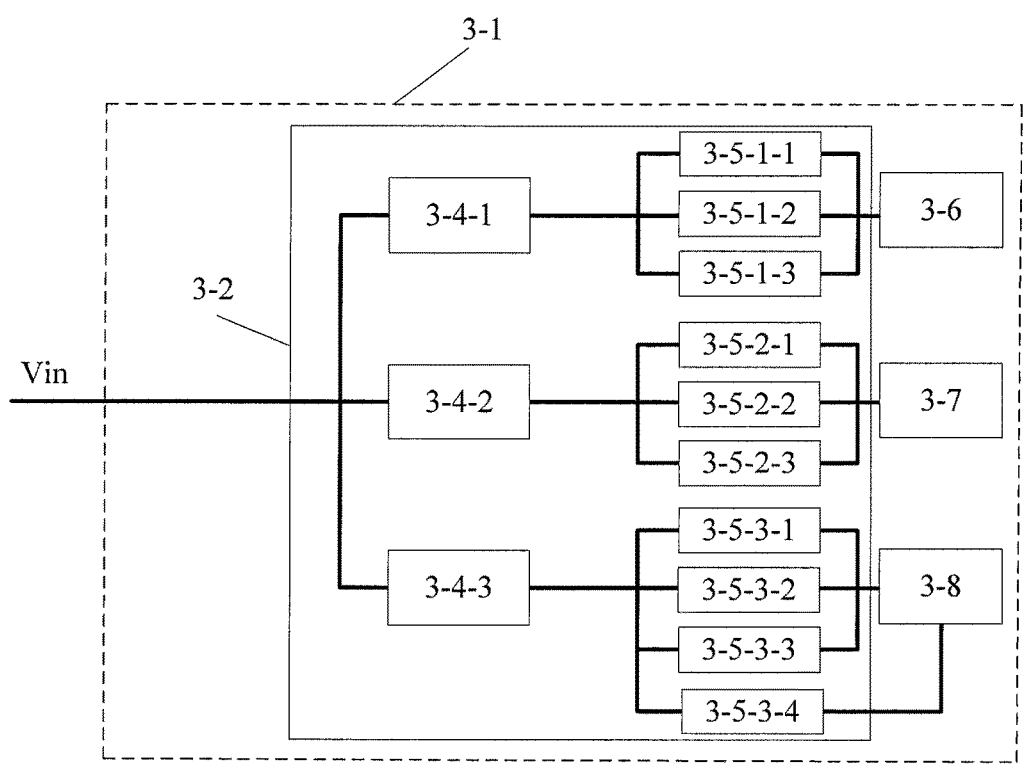
FIG. 3C is a schematic diagram of another modification of the power converter in FIG. 3A.

FIG. 3C shows a schematic diagram of another modification of the power converter in FIG. 3A. Unlike the power converter in FIG. 3A, the load 3-8 of the power converter 3-2 requires multiple power supply voltages. In this regard, the input terminals of the post-stage circuits 3-5-3-1, 3-5-3-2, 3-5-3-3 and 3-5-3-4 are connected in parallel to the output terminal of the pre-stage circuit 3-4-3, for receiving the bus voltage outputted by the pre-stage circuit 3-4-3. Each of the post-stage circuits 3-5-3-1, 3-5-3-2, 3-5-3-3 and 3-5-3-4 converts the bus voltage to a respective output voltage. The output terminals of the post-stage circuits 3-5-3-1, 3-5-3-2 and 3-5-3-3 are connected in parallel to collectively provide an output voltage to power the load 3-8, and the post-stage circuit 3-5-3-4 outputs another output voltage to power the load 3-8.

Figure 4:
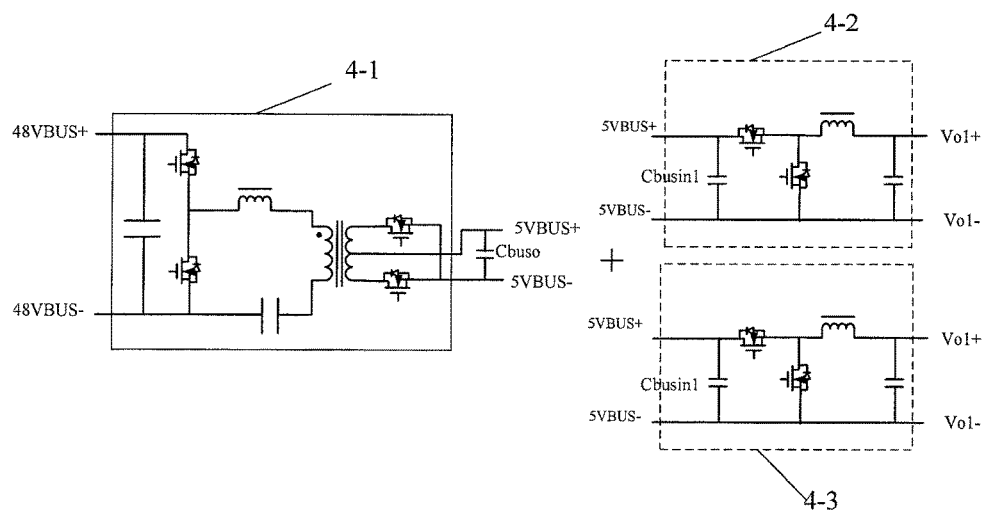
FIG. 4 is a topology of a two-stage circuit in the power converter of FIGS. 3A-3C.

FIG. 4 is a topology of the two-stage circuit in the power converter of FIGS. 3A-3C. As shown in FIG. 4, the pre-stage circuit 4-1 is an isolation DC-DC circuit, and two input terminals (48VBUS+, 48VBUS−) thereof receive an input voltage of 48V and convert the input voltage to a bus voltage of 5V, and the bus voltage is output from two output terminals (5VBUS+, 5VBUS−). An output capacitor Cbuso is connected in parallel across the two output terminals (5VBUS+, 5VBUS−) of the pre-stage circuit 4-1. The output capacitor Cbuso can be a capacitor, or can also include a plurality of parallel capacitors. Post-stage circuits 4-2 and 4-3 are all BUCK circuits. Each of the post-stage circuits 4-2 and 4-3 receives the bus voltage of 5V outputted by the pre-stage circuit through two input terminals (5VBUS+, 5VBUS−) thereof, and converts the bus voltage of 5V to an output voltage, which is outputted from two output terminals (Vo1+, Vo1−) of each of the post-stage circuits 4-2 and 4-3. An input capacitor Cbusin1 is connected in parallel across the two input terminals (5VBUS+, 5VBUS−) of each of the post-stage circuits 4-2 and 4-3. Similarly, the input capacitor Cbusin1 can be a capacitor, or it can also include a plurality of parallel capacitors. In the present embodiment, the input voltage received by the pre-stage circuit 4-1 is typically greater than the output voltage of the post-stage circuits 4-2 and 4-3, and even the input voltage is greater than 10 times of the output voltage. The input voltage can range from an interval within 10V~500V, for example, 18V~36V, 36V~72V, 150V~300V, 300V~500V or the like, depending on specific application. The loads on the data processing mainboard can also include various types, such as a data processing chip, a CPU, a memory and a graphic processing unit (GPU) or the like. The output voltage output from the post-stage circuit can range from 0.5V to 3.3V.

Figure 5:
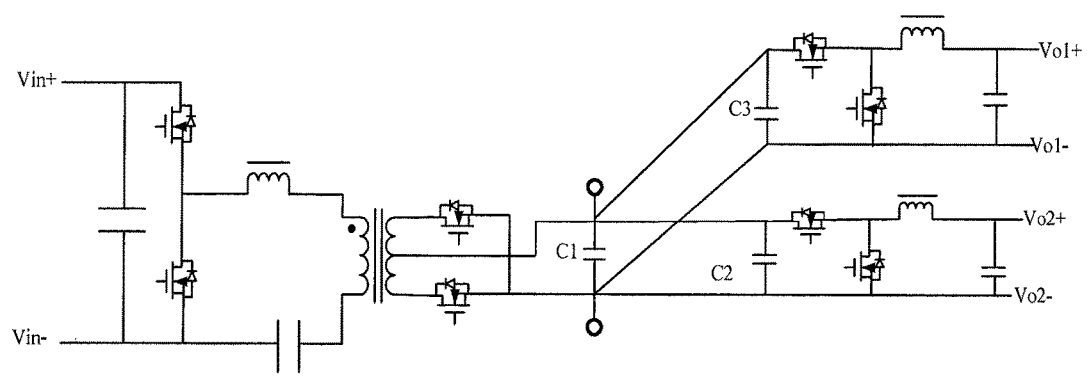
FIG. 5 is a circuit topology of a power converter according to an embodiment of the present disclosure.

FIG. 5 shows a circuit topology of the power converter according to the present embodiment. In FIG. 5, the pre-stage circuit is an isolation buck DC-DC circuit with a transformer, and the post-stage circuit is a non-isolation DC-DC circuit. In case where a high voltage is to be converted to a low voltage, the pre-stage circuit typically includes a transformer to achieve a reduction voltage at a large scale with high efficiency, and achieve isolation between the input and the output when necessary. The pre-stage circuit can be a PWM type circuit, and can also be a resonant circuit. Generally, in order to achieve small volume and high efficiency, the pre-stage circuit can be a resonant circuit, for example a LLC resonant circuit (the pre-stage circuit is represented by a LLC circuit hereinafter), to achieve high frequency and high efficiency. The pre-stage circuit achieves coarse buck conversion, that is, the input voltage is converted to a bus voltage which can vary within a certain range smaller than a variation range of an output voltage of a non-control pre-stage circuit. The post-stage circuit achieves precise buck conversion, i.e. the bus voltage is converted to an output voltage, and the bus voltage is precisely controlled to stabilize the output voltage at a desired voltage value. The post-stage circuit can be a BUCK circuit (the post-stage circuit is represented by a BUCK circuit hereinafter) to achieve high efficiency, high precision and quick response. Such a two-stage circuit can achieve coordination and cooperation, meet the requirement of a super large scale of buck conversion, high efficiency, high precision and quick response and even high voltage isolation required by the power converter. In order to achieve better performance, a plurality of BUCK circuits can be connected in interleaving mode. The pre-stage circuit and a plurality of post-stage circuits can be optimized independently, which makes the frequency of the post-stage circuits be increased to more than several MHZ, achieving a small volume and a high power density required by the power converter. The power converter can solve the problems of isolation and the wide range of operating voltage, and can take both of high efficiency and high power density into consideration.

In addition, as shown in FIG. 5, an output capacitor C1 is connected in parallel across the output terminals of the pre-stage circuit. Input capacitors C2 and C3 are connected in parallel across the input terminals of the post-stage circuits. There is an inductor (not shown in the figure) between C1 and C2 and an inductor (not shown in the figure) between C1 and C3. Each of the inductor is a parasitic inductor, and the inductance of the parasitic inductor depends on the set distance between C1 and C2 or the set distance between C1 and C3.

As shown in FIG. 5, each of the output terminals (Vo1+, Vo1−, Vo2+, Vo2−) of the two BUCK circuits outputs an output voltage. When a load requires a large current, the output terminals of the two BUCK circuits can be connected in parallel, and the two BUCK circuits provide an output voltage for the load collectively. When a load requires two channels of output voltages, the two BUCK circuits separately provide output voltages for the load. When there are two loads and each of the loads requires a separate power supply, the two BUCK circuits respectively provide an output voltage for a corresponding load. According to the requirement of the load on the power supply, the BUCK circuits can be connected in different forms to achieve greater flexibility. In the present embodiment, one LLC circuit and two BUCK circuits are provided merely for example, and there can also be a plurality of LLC circuits and a plurality of BUCK circuits.

Figure 6:
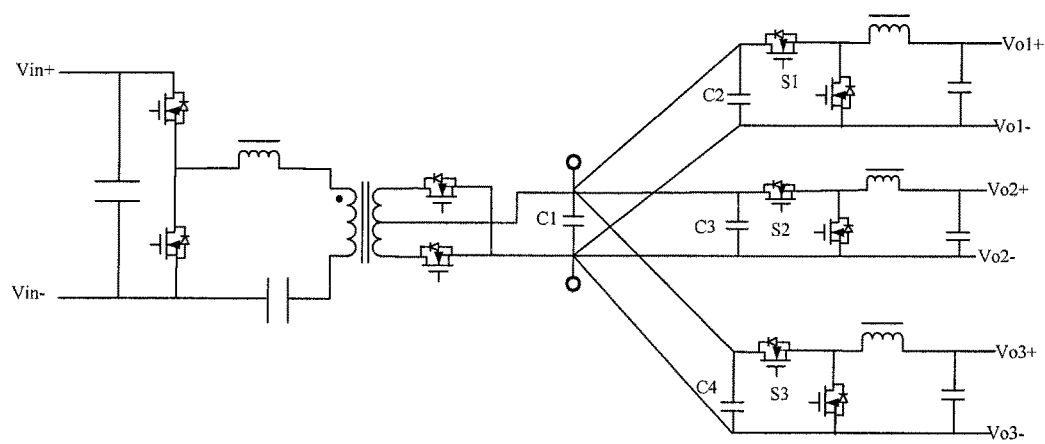
FIG. 6 is a circuit topology of another power converter according to an embodiment of the present disclosure.

FIG. 6 shows another circuit topology of the power converter according to the present embodiment. In this power converter, the pre-stage circuit is an isolation BUCK DC-DC circuit with a transformer, and the post-stage circuit is a non-isolation DC-DC circuit. The power circuit as shown in FIG. 6 is different from the power converter in FIG. 5 in that the post-stage circuit of the power circuit as shown in FIG. 6 is composed of three BUCK circuits connected in parallel.

As shown in FIG. 6, the output capacitor C1 is connected in parallel across the output terminals of the pre-stage circuit of the power converter. The input capacitors C2, C3 and C4 are connected across the input terminals of the three BUCK circuits of the post-stage circuits respectively. There is an inductor (not shown in the figure) between C1 and C2, an inductor (not shown in the figure) between C1 and C3 and an inductor (not shown in the figure) between C1 and C4. Each of the inductors is a parasitic inductor, the inductance of the parasitic inductor depends on the distance between C1 and C2, the distance between C1 and C3 or the distance between C1 and C4.

As shown in FIG. 6, each of the output terminals (Vo1+, Vo1−, Vo2+, Vo2−, Vo3+, Vo3−) of three BUCK circuits outputs output voltage respectively. When one load demands a large current, the output terminals of the three BUCK circuits can be connected in parallel, and the three BUCK circuits provide an output voltage for the load collectively. When one load demands two output voltages, each of the two BUCK circuits thereof provides an output voltage to the load respectively. When there are three loads and each of the loads demands a separate power supply, each of the three BUCK circuits provides an output voltage to a respective load. According to the power supply demanded by the loads, the BUCK circuits can be connected in different forms to achieve greater flexibility.

In the present embodiment, the LLC circuit can provide a bus voltage to the BUCK circuits, and the bus voltage outputted by the LLC circuit can also serve as an auxiliary output voltage to the loads. That is, the loads can be directly connected to the output terminal of the LLC circuit. Since the output terminals of the LLC circuit are not only connected with the BUCK circuits, but also connected with the loads, the power of the LLC circuit should be higher than the input power of the BUCK circuits, for example, 110% higher or above. It means that the LLC circuit can have an additionally flexible power of more than 10%, increasing the application flexibility of the power converter.

The Second Embodiment

Figure 7:
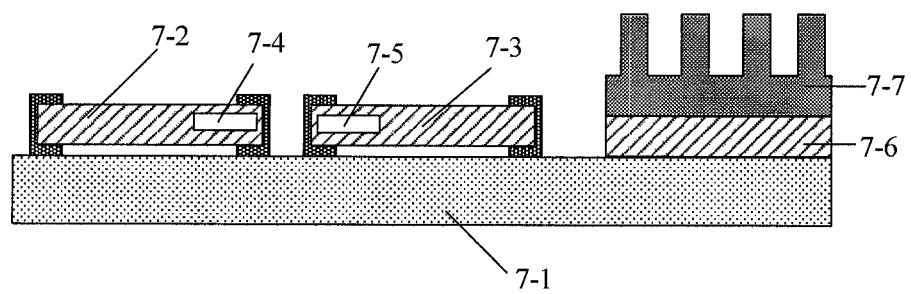
FIG. 7 is a schematic diagram of a package of a power converter according to an embodiment of the present disclosure.

FIG. 7 shows a schematic diagram of a package structure of the power converter. As shown in FIG. 7, the pre-stage circuit 7-2 (for example, a LLC circuit) and the plurality of post-stage circuit 7-3 (for example, BUCK circuits) are packaged in an independent module respectively, and are disposed on the data processing board 7-1. A CPU 7-6 and a radiator 7-7 are also disposed on the data processing board 7-1, wherein the radiator 7-7 dissipates heat from the CPU 7-6 and the power converter provides power to the CPU 7-6. The pre-stage circuit 7-2 includes an output capacitor 7-4 and each of the plurality of post-stage circuits 7-3 includes an input capacitor 7-5. The pre-stage and plurality of post-stage circuits are disposed in a respective package module, to form two separate components. In practical application, the distance between the output capacitor 7-4 of the pre-stage circuit and the input capacitors 7-5 of the plurality of post-stage circuit is so large that there is a large equivalent inductor between the output capacitor 7-4 and the input capacitors 7-5. That is, the output capacitor 7-4 is only a filter of the pre-stage circuit, and the input capacitor 7-5 is only a filter of the post-stage circuit respectively. The bus voltage of the pre-stage circuit 7-2 is connected to the data processing mainboard 7-1 via output pins (PINs) of the pre-stage circuit module, and connected with the input pins of the plurality of post-stage circuits 7-3 via the data mainboard 7-1, such that the output terminal of the pre-stage circuit 7-2 are connected to the input terminal of the plurality of post-stage circuits 7-3. Since such a package structure of the power converter requires pins at the output terminal of the pre-stage circuit 7-2 and input terminal of the plurality of post-stage circuits 7-3 to electrically connect the pre-stage circuit 7-2 and the plurality of post-stage circuits 7-3, and wastes the space of the data processing mainboard 7-1 due to installation and heat dissipation. More particularly, in case where the power converter carries heavy loads, in order to reduce the conduction loss of the power converter, the number of pins required to connect the pre-stage circuit 7-2 and the plurality of post-stage circuits 7-3 is huge, significantly wasting the space of the data processing mainboard 7-1 and increasing the volume thereof.

Figure 8:
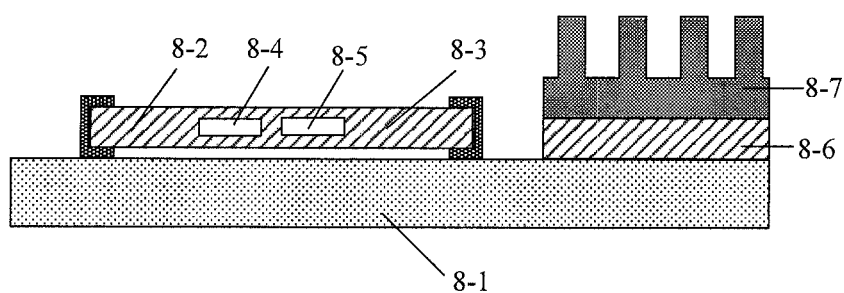
FIG. 8 is a schematic diagram of another package of a power converter according to an embodiment of the present disclosure.

In order to solve the above problem, the pre-stage circuit and the plurality of post-stage circuits of the power converter are packaged in one common module, for example, the package structure as shown in FIG. 8. In FIG. 8, the pre-stage circuit 8-2 and the plurality of post-stage circuits 8-3 are packaged in one common module collectively, and then the power converter is disposed on the data processing board 8-1. A CPU 8-6 and a radiator 8-7 are also disposed on the data processing board 8-1, wherein the radiator 8-7 dissipates heat from the CPU 8-6. The pre-stage circuit 8-2 includes an output capacitor 8-4, and each of the plurality of post-stage circuits 8-3 includes an input capacitor 8-5. The output capacitor 8-4 and the input capacitors 8-5 are disposed adjacently. The pre-stage circuit 8-2 and the plurality of post-stage circuits 8-3 of such a package structure are electrically connected firstly and packaged later, therefore, pins are not required at the output terminal of the pre-stage circuit 8-2 and the input terminal of the plurality of post-stage circuits 8-3. Moreover, the distance between the output capacitor 8-4 of the pre-stage circuit and the input capacitors 8-5 of the plurality of post-stage circuits is so close that there is a small equivalent inductor between the output capacitor 8-4 and the input capacitors 8-5, and a part of the AC current in the output current from the pre-stage circuit 8-2 can be directly transmitted to the input terminals of the plurality of post-stage circuits 8-3 such that the output capacitor 8-4 and the input capacitors 8-5 handle total AC current which is reduced. Thereby, the overall volume of the output capacitor 8-4 and the input capacitors 8-5 can be reduced, the loss is reduced, and the overall volume of the power converter is in turn notably reduced. Moreover, the power converter occupies a small space on the data processing mainboard 8-1, which lowers the cost.

Figure 9:
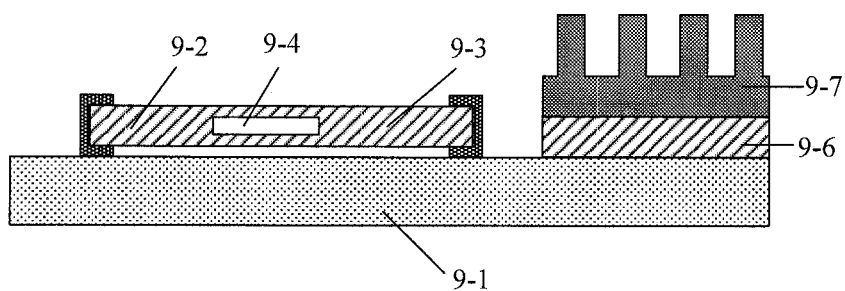
FIG. 9 is a schematic diagram of still another package of a power converter according to an embodiment of the present disclosure.

Further, as shown in FIG. 9, the pre-stage circuit 9-2 and the plurality of post-stage circuit 9-3 packaged in the same module share the same capacitor 9-4. That is, the capacitor 9-4 serves as both the output capacitor of the pre-stage circuit 9-2 and the input capacitors of the plurality of post-stage circuit 9-4. Thereby, a part of the AC current in the output current from the pre-stage circuit 9-4 can be directly transmitted to the input terminals of the plurality of post-stage circuit 9-3, such that the capacitor 9-4 handles a total AC current which is reduced, and the volume, cost and loss of the capacitor are reduced.

Figure 10A:
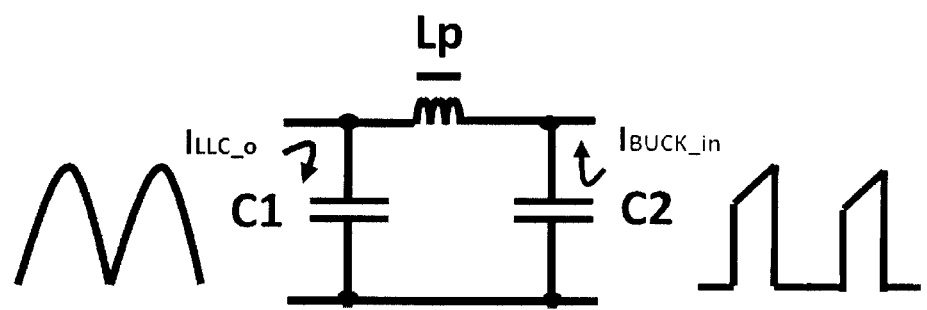
FIG. 10A is a schematic diagram of a part of a circuit in a power converter according to an embodiment of the present disclosure.
Figure 10B:
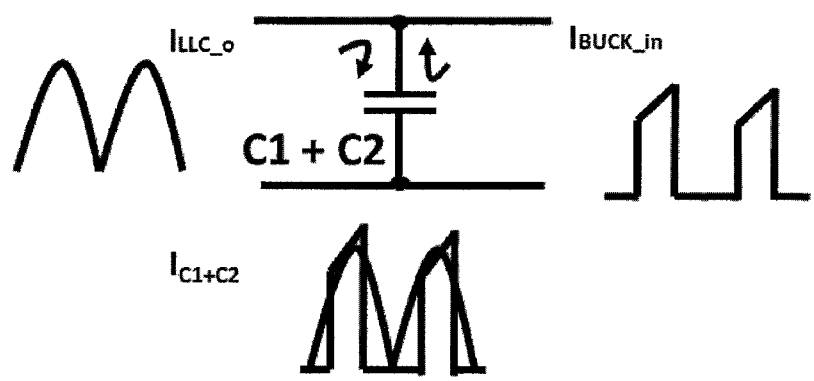
FIG. 10B is a schematic diagram of a part of a circuit in a power converter according to an embodiment of the present disclosure.

FIGS. 10A and 10B present detailed illustration. FIGS. 10A and 10B show schematic diagrams of a part of the circuit of the power converter. As shown in FIG. 10A, when the pre-stage circuit and the plurality of post-stage circuit are packaged in a respective module, since there is a set distance between the output capacitor C1 of the LLC circuit and the input capacitor C2 of the BUCK circuit, referring to the distance between the output capacitor 7-4 and input capacitor 7-5 in FIG. 7, as described above, a parasitic inductor (an equivalent inductor), which is a stray inductor, typically exists between the output capacitor 7-4 and input capacitor 7-5. The distance between the output capacitor 7-4 and input capacitor 7-5 corresponds to the inductance of the stray inductor Lp (such as the equivalent stray inductor caused by pins, wirings and the like). In FIG. 10, $I_{LLC\_O}$ is an output current of the pre-stage circuit, $I_{BUCK\_in}$ is an input current of the post-stage circuit. If Lp is innegligible, for example larger than 10 nH (the inductor value at the frequency of the current output of the pre-stage circuit. In the present embodiment, if the pre-stage circuit in FIG. 5 is a LLC circuit for example, and its output side adopts a full-wave rectification circuit, the frequency of the output current is twice the operating frequency of the switching devices in the LLC circuit), the stray inductor Lp will hinder the output current of the pre-stage circuit to be distributed between the output capacitor 7-4 and the input capacitor 7-5. Therefore, the output capacitor C1 of the pre-stage circuit will bear most part of the AC component in the output current of the pre-stage circuit, for example, more than 90% of the effective value of the $I_{LLC\_o}$ of the AC component; while the post-stage input capacitor C2 will also bear most part of the AC component in the input current of the post-stage circuit, for example, more than 90% of the effective value of the $I_{BUCK\_in}$ of the AC component. Thereby, in stable operation, the effective value of the current $I_{CAP}$ flowing through all of the capacitors (C1, C2) is larger than 90% of ($I_{LLC\_o}$+ $I_{BUCK\_in}$), that is, the total volume of the capacitors will hardly be reduced due to the series connection of the pre-stage circuit and the post-stage circuit.

When the pre-stage circuit and the post-stage circuit are packaged in one module, the stray inductor Lp will be reduced, for example, to below 5 nH or even be negligible.

FIG. 10 shows an ideal condition, that is, the pre-stage circuit and the post-stage circuit share capacitors C1+C2. Then, a parasitic inductor does not exist between the pre-stage capacitor and the post-stage capacitor. In this way, the AC components in the output current $I_{LLC\_o}$ of the pre-stage circuit and the input current $I_{BUCK\_in}$ of the post-stage circuit can be counteracted with each other, and then the effective value $I_{CAP}$ of the current $I_{C1+C2}$ on the capacitors C1+C2 will be much lower than that shown in FIG. 10, that is, $I_{CAP}$<90% ($I_{LLC\_o}$+$I_{BUCK\_in}$) or even $I_{CAP}$<80% ($I_{LLC\_o}$+$I_{BUCK\_in}$). In other words, the number of capacitors C1+C2 can be reduced significantly, and loss of the capacitors can also be reduced.

Figure 11A:
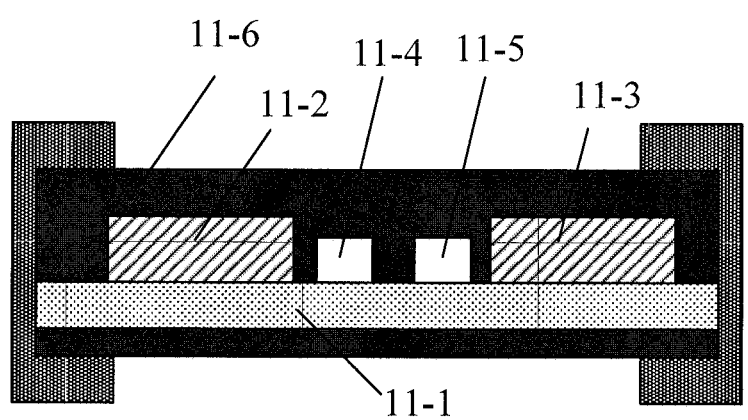
FIG. 11A is a schematic diagram of a packaged power converter according to an embodiment of the present disclosure.

FIG. 11A is a schematic diagram of the package structure of the power converter. As shown in FIG. 11, the transformer 11-2 in the pre-stage circuit (for example, a LLC circuit) is disposed on a substrate (for example, on a PCB board 11-1 as shown in the figure), and an inductor 11-3 in the post-stage circuit (for example, a BUCK circuit) is also disposed on the PCB board 11-1. An output capacitor 11-4 of the pre-stage circuit and an input capacitor 11-5 of the post-stage circuit are also disposed on the PCB board 11-1 and between the transformer 11-2 and the inductor 11-3. The transformer 11-2 and the output capacitor 11-4 in the pre-stage circuit and the inductor 11-3 and input capacitor 11-5 of the post-stage circuit are packaged by black molding material 11-6 shown in the figure, to form a package module. Moreover, input and output pins and signal pins are mounted at the edge of the package module, to connect with the semiconductor devices or other electronic devices in the pre-stage circuit and the post-stage circuit respectively. The substrate can also be a direct bonded copper (DBC), a chip on board (COB) or the like, apart from the PCB substrate. However, the package module in the figure can also be unpackaged, that is, molding material is not covered outside the transformer 11-2 and the output capacitor 11-4 of the pre-stage circuit and the inductor 11-3 and the input capacitor 11-5 of the post-stage circuit, as shown in FIG. 11B.

Figure 11B:
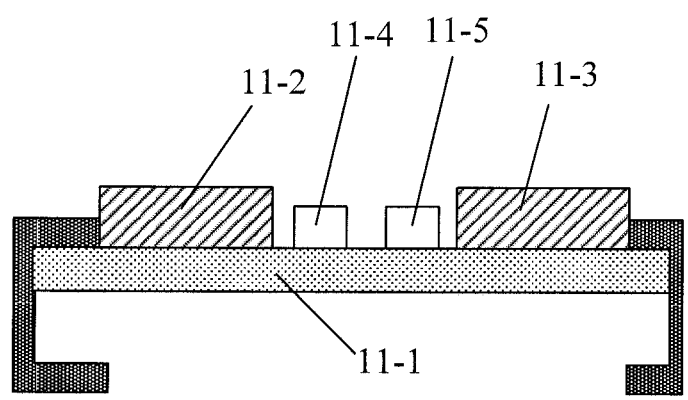
FIG. 11B is a schematic diagram of unpackaged power converter according to an embodiment of the present disclosure.
Figure 11C:
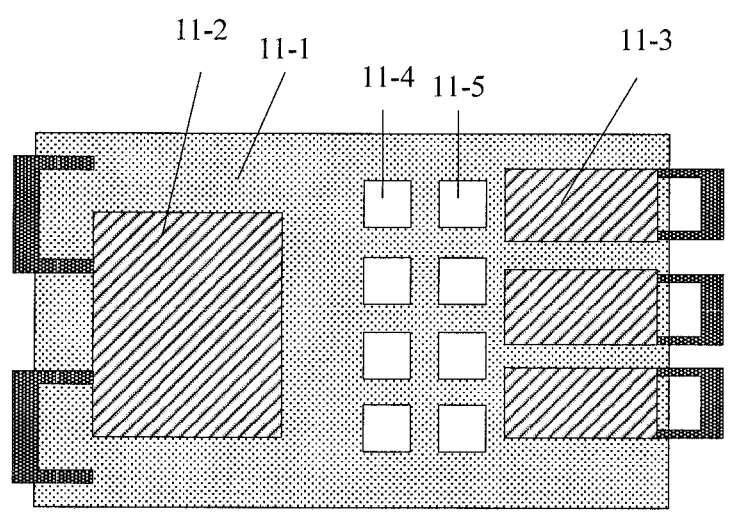
FIG. 11C is a plan view of FIG. 11B.

FIG. 11C is a plan view of FIG. 11B. In FIG. 11C, the semiconductor switching device of the pre-stage circuit and the post-stage circuit can also be disposed on the substrate, which is not shown in the figure.

In the present embodiment, in order to maximize counteraction of the AC components in the output current $I_{LLC\_o}$ of the pre-stage circuit and the input current $I_{BUCin}$ of the post-stage circuit, reference can be made to the following detailed description. A stray inductor Lp exists between the output capacitor C1 of the pre-stage circuit and the input capacitor C2 of the post-stage circuit. The value of the stray inductor will directly decide the effect of the counteraction of the AC components in the output current $I_{LLC\_o}$ of the pre-stage circuit and the input current $I_{BUCin}$ of the post-stage circuit. For the output current of the pre-stage circuit (for example, a LLC circuit), such as $I_{LLC\_o}$ in FIGS. 10A and 10B, if the current output from the pre-stage circuit flowing through either the output capacitor C1 or the input capacitor C2 is less than or equal to k times of $I_{LLC\_o}$, that is, if the output capacitor C1 and the input capacitor C2 branches have a desirable effect of distributing the output current of the pre-stage circuit, the following condition is to be satisfied:

$$k \geq \left| \frac{Z_{C1}}{Z_{C1} + Z_{Lp\_C2}} \right| \geq 1 - k \tag{1}$$

That is, $$\frac{1-k}{k} \leq \left| \frac{Z_{Lp\_C2}}{Z_{C1}} \right| \leq \frac{k}{1-k} \tag{2}$$

Wherein, $$Z_{Lp\_C2} = j \cdot 2\pi \cdot f_{LLCo} \cdot L_p + \frac{1}{j \cdot 2\pi \cdot f_{LLCo} \cdot C2} \text{ and} \tag{3}$$

$$Z_{C1} = \frac{1}{j \cdot 2\pi \cdot f_{LLCo} \cdot C1} \tag{4}$$

Moreover, 0.5≤k≤1, for example k=0.9.

In the above formulas of (1)-(4), $f_{LLCo}$ denotes the frequency of the output current of the pre-stage circuit (for example, a LLC circuit), $Z_{C1}$ denotes the impedance of the output capacitor C1, $Z_{LP\_C2}$ denotes the impedance of the first series branch defined by the stray inductor Lp and the input capacitor C2 of the post-stage circuit.

That is, at the frequency $f_{LLCo}$ of the output current of the pre-stage circuit (for example, a LLC circuit), the absolute value of the impedance of the first series branch defined by the stray inductor Lp and the input capacitor C2 is smaller than or equal to $$\frac{k}{1-k}$$

times of the absolute value of the impedance of the output capacitor C1, and greater than or equal to $$\frac{1-k}{k}$$

times of the absolute value of the impedance of the output capacitor C1. For example, when k is equal to 90%, $$\frac{1}{9}|Z_{C1}| \leq |Z_{Lp\_C2}| \leq 9 \cdot |Z_{C1}|.$$

In addition, another condition is also to be satisfied. That is, the impedance of the first series branch defined by the stray inductor Lp and input capacitor C2 is capacitive at the frequency $f_{LLCo}$ of the output current of the LLC circuit, that is, $$2\pi \cdot f_{LLCo} \cdot L_p \leq \frac{1}{2\pi \cdot f_{LLCo} \cdot C2} \tag{5}$$

If the conditions (2) and (5) are satisfied, both of the output capacitor C1 and the input capacitor C2 are fully utilized to distribute the output current of the pre-stage circuit.

Similarly, for the input current of the post-stage circuit (for example, a BUCK circuit), such as $i_{BUCK\_in}$ in FIGS. 10A and 10B, if the input current of the post-stage circuit flowing through either the output capacitor C1 or the input capacitor C2 is less than or equal to q times of $i_{BUCK\_in}$, that is, if the output capacitor C1 and the input capacitor C2 branches have a desirable effect of distributing the input current of the post-stage circuit, the following condition is to be satisfied:

$$\frac{1-q}{q} \leq \left|\frac{Z_{Lp\_C1}}{Z_{C2}}\right| \leq \frac{q}{1-q} \text{ and} \quad (6)$$

$$2\pi f_{BUCK\_IN} \cdot L_p \leq \frac{1}{2\pi \cdot f_{BUCK\_IN} \cdot C1} \quad (7)$$

Wherein, $$Z_{Lp\_C1} = j \cdot 2\pi \cdot f_{BUCK\_IN} \cdot L_p + \frac{1}{j \cdot 2\pi \cdot f_{BUCK_{IN}} \cdot C1} \text{ and} \quad (8)$$

$$Z_{C2} = \frac{1}{j \cdot 2\pi \cdot f_{BUCK\_IN} \cdot C2} \quad (9)$$

Wherein, 0.5≤q≤1, for example q=0.9.

In the above formulas of (6)-(9), $f_{BUCK\_in}$ denotes the frequency of the input current of the post-stage circuit (for example, a BUCK circuit), $Z_{C2}$ denotes the impedance of the input capacitor C2, $Z_{LP\_C1}$ denotes the impedance of the second series branch defined by the stray inductor Lp and the output capacitor C1 of the pre-stage circuit.

That is, at the frequency $f_{BUCK\_in}$ of the input current of the post-stage circuit (for example, a BUCK circuit), the absolute value of the impedance of the second series branch defined by the stray inductor Lp and the output capacitor C1 of the pre-stage circuit is smaller than or equal to $$\frac{q}{1-q}$$

times of the absolute value of the impedance of the input capacitor C2 of the post-stage circuit, and greater than or equal to $$\frac{1-q}{q}$$

times of the absolute value of the impedance of the input capacitor C2 of the post-stage circuit. When q is equal to 90%, $$\frac{1}{9}|Z_{C2}| \leq |Z_{Lp\_C1}| \leq 9 \cdot |Z_{C2}|.$$

In addition, another condition is also to be satisfied. That is, the impedance of the second series branch defined by the stray inductor Lp and output capacitor C1 of the pre-stage circuit is capacitive at the frequency $f_{BUCK\_in}$ of the input current of the BUCK circuit, that is:

$$2\pi \cdot f_{LLCo} \cdot L_p \leq \frac{1}{2\pi \cdot f_{LLCo} \cdot C1} \quad (10)$$

It can be seen that, if conditions (6) to (10) are satisfied, both of the output capacitor C1 and the input capacitor C2 are fully utilized to distribute the input current of the post-stage circuit.

It can also be seen that, if the conditions (2) to (10) are satisfied, both of the output current of the pre-stage circuit and the input current of the post-stage circuit flow through the output capacitor of the pre-stage circuit and the input capacitor of the post-stage circuit, and evenly distributed to the output capacitor of the pre-stage circuit and the input capacitor of the post-stage circuit. Moreover, the output current of the pre-stage circuit and the input current of the post-stage circuit are at least partly counteracted on the output capacitor and the input capacitor, thus reducing the total volume, number, and even loss of the capacitors significantly.

The values of k, q in the formulas are determined collectively by the output capacitor C1, the input capacitor C2 and the stray capacitor Lp. For the formulas (2) and (6), to achieve a desirable current distributing effect, the values of k, q are approximately 0.5.

Figure 12:
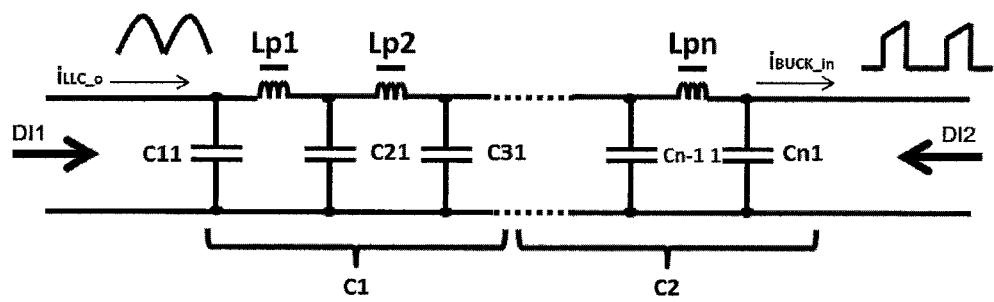
FIGS. 12-15 are schematic diagrams of a part of a circuit in a power converter according to embodiments of the present disclosure.
Figure 13:
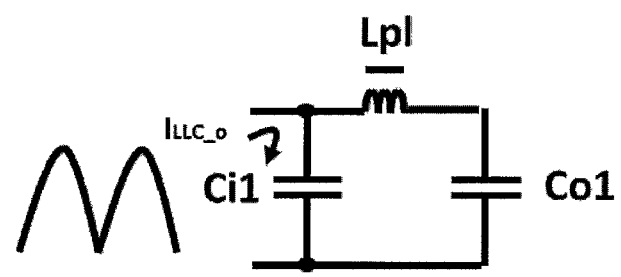
Figure 14:
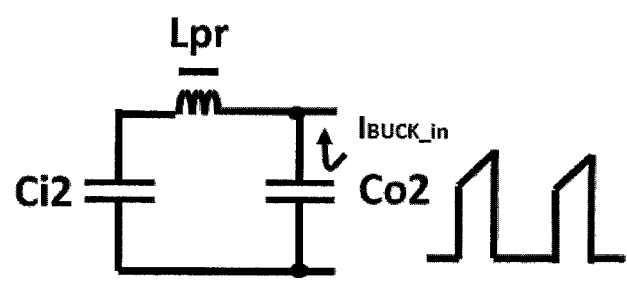

However, in fact, since the capacity of a single capacitor is limited, in order to meet the requirement of the voltage ripple output by the pre-stage circuit and the current ripple of the capacitor itself, the output capacitor C1 of the pre-stage circuit or the input capacitor C2 of the post-stage circuit typically contains a plurality of capacitors connected in parallel. As shown in FIG. 12, the output capacitor C1 contains a plurality of capacitors C11, C21 and C31 which are connected in parallel. The input capacitor C2 contains capacitors Cn-11 and Cn1 which are connected in parallel. The capacitors connected in parallel have parasitic inductors or the other parameters, such as the stray inductor Lp1, Lp2, . . . , Lpn or the like. As described above, in order to fully utilize the capacitors, the stray inductors are excepted to be as small as possible around the frequency of the output current $i_{LLC\_o}$ and the input current $i_{BUCK\_in}$. Then, the current will be distributed on each of the capacitors according to the capacitances of the capacitors, so the AC components in the output current of the pre-stage circuit and the input current of the post-stage circuit can be partly or even totally counteracted, and the number, capacitances and volumes of the capacitors can be decreased. In generally, the pre-stage circuit and the post-stage circuit are packaged in the same module, so the distances between the capacitors are relatively small, and the stray inductors Lp1, Lp2, . . . , Lpn are relatively small. However, as seen from the output terminal of the pre-stage circuit to the post-stage circuit (i.e. the direction of the left arrow DR as shown in FIG. 12), the capacitor configuration of FIG. 12 can be equivalent to the circuit as shown in FIG. 13. Similarly, as seen from the input terminal of the post-stage circuit to the pre-stage circuit (i.e. the direction of the right arrow DI2 as shown in FIG. 12), the capacitor configuration of FIG. 12 can also be equivalent to the circuit as shown in FIG. 14. As shown in FIG. 13, if the following conditions are satisfied, for the output current of the pre-stage circuit, the output capacitor configuration can be utilized to a high degree:

$$\frac{1-m}{m} \leq \left|\frac{Z_{Lp1\_Co1}}{Z_{C1}}\right| \leq \frac{m}{1-m} \quad (11)$$

$$2\pi \cdot f_{LLCo} \cdot L_{pl} \leq \frac{1}{2\pi \cdot f_{LLCo} \cdot Co1} \quad (12)$$

Wherein, $$Z_{Lpl\_Col} = j \cdot 2\pi \cdot f_{LLCo} \cdot L_{pl} + \frac{1}{j \cdot 2\pi \cdot f_{LLCo} \cdot Col} \quad (13)$$

$$Z_{Cil} = \frac{1}{j \cdot 2\pi \cdot f_{LLCo} \cdot Cil} \quad (14)$$

Figure 15:
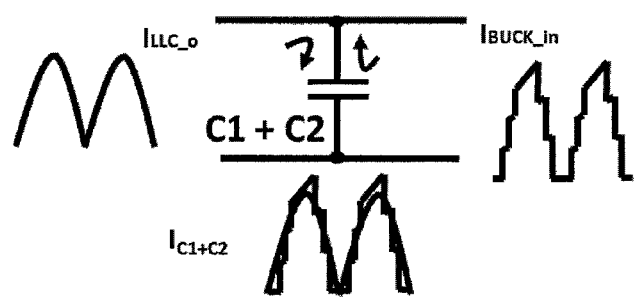

As shown in FIG. 15, if the following conditions are satisfied, for the input current of the post-stage circuit, the input capacitor configuration can be utilized to a high degree:

$$\frac{1-n}{n} \leq \left| \frac{Z_{Lpr\_Ci2}}{Z_{Co2}} \right| \leq \frac{n}{1-n} \quad (15)$$

$$2\pi f_{BUCK\_IN} \cdot L_{pr} \leq \frac{1}{2\pi \cdot f_{BUCK\_IN} \cdot Ci2} \quad (16)$$

Wherein, $$Z_{Lpr\_Ci2} = j \cdot 2\pi \cdot f_{BUCK\_IN} \cdot L_{pr} + \frac{1}{j \cdot 2\pi \cdot f_{BUCK_{IN}} \cdot Ci2} \quad (17)$$

$$Z_{Co2} = \frac{1}{j \cdot 2\pi \cdot f_{BUCK\_IN} \cdot Co2} \quad (18)$$

If all the conditions (11) to (18) are satisfied, both of the output current of the pre-stage circuit and the input current of the post-stage circuit flow through the input capacitor configuration and output capacitor configuration, and counteracted at least partly on the capacitor configurations, thus reducing the total volume, number, and even loss of the capacitors significantly.

The inductances of the above stray inductors mentioned above can be derived through various ways, for example, by physically modeling the power converter through Maxwell Q3D.

For the power level of 100 W to 200 W, under a two-stage circuit framework in which the pre-stage circuit is a LLC circuit and the post-stage circuit is a BUCK circuit, when the operating frequency of the LLC circuit is 1 MHz and the operating frequency of the BUCK circuit is 500 kHz, the output capacitor C1 of the LLC circuit and the input capacitor C2 of the BUCK circuit can be about 150 uF and 200 uF respectively. When $i_{LLC\_o}$ operates separately, in order to achieve a current distributing effect that either of the current on the output capacitor C1 and the input capacitor C2 is smaller than or equal to 0.7 times of $i_{LLC\_o}$, the range of the stray inductor between the output capacitor C1 and input capacitor C2 is:

$$-0.27 \text{ nH} = \frac{\frac{1}{C2} - \frac{k}{1-k} * \frac{1}{C1}}{(2\pi f_{LLCo})^2} \leq L_p \leq \frac{\frac{1}{C2} - \frac{1-k}{k} \frac{1}{C1}}{(2\pi f_{LLCo})^2} = 54.3 \text{ pH}$$

When $i_{BUCK\_in}$ operates separately, in order to achieve a current distributing effect that either of the output capacitor C1 and the input capacitor C2 is smaller than or equal to 0.7 times of $i_{BUCK\_in}$, the range of the stray inductor between the output capacitor C1 and input capacitor C2 is:

$$-0.51 \text{ nH} = \frac{\frac{1}{C1} - \frac{q}{1-q} * \frac{1}{C2}}{(2\pi f_{BUCK\_IN})^2} \leq L_p \leq \frac{\frac{1}{C1} - \frac{1-q}{q} \frac{1}{C2}}{(2\pi f_{BUCK\_IN})^2} = 0.46 \text{ nH}$$

As described above, the above LLC circuit and the BUCK circuit are particular examples of the pre-stage circuit and the post-stage circuit respectively, but the pre-stage circuit and the post-stage circuit can also be other topologies in fact. For example, the pre-stage circuit and the post-stage circuit can also be any combination of a half bridge (HB), an asymmetry half bridge (AHB), a full bridge (FB), a phase shift full bridge (PSFB), a forward circuit, a flyback circuit, a BUCK-Boost circuit and a pre-stage BUCK circuit and a post-stage BUCK circuit.

The above provides a means to counteract the AC components in the output current of the pre-stage circuit and the input current of the post-stage circuit. However, the effect of the counteraction also depends on the phases and the frequencies of the output current of the pre-stage circuit and the input current of the post-stage circuit. In order to achieve a better effect of counteracting the AC components in the output current of the pre-stage circuit and the input current of the post-stage circuit, the pre-stage circuit and the post-stage circuit can be synchronized. FIG. 10 shows a synchronous effect when the operating frequency of the pre-stage circuit (for example, a LLC circuit) has an operating frequency half of that of the post-stage circuit (for example, a BUCK circuit). When the LLC circuit is outputting current, a part of the current can be transmitted to the BUCK circuit without being processed by the capacitor.

With the increase of the transmission power, the post-stage circuit typically adopts a structure containing a plurality of circuits connected in parallel. In order to reduce the ripple of the input current of a plurality of post-stage circuits, the plurality of circuits can be operated in an interleaving mode, that is, the plurality of post-stage circuits connected in parallel have the same operating frequency, but the phases are different. Most typically, phase differences between the parallel circuits are the same. As shown in FIG. 15, in order to further counteract the AC components in the output current and the input current, the phase differences between the plurality of BUCK circuits can be unequal, rather than the typical equal phase differences. Thereby, the input currents $i_{BUCK\_in}$ of the plurality of BUCK circuits connected in parallel can be fitted to be similar to an output current $i_{LLC\_o}$ of the LLC circuit, that is, the AC components there between can be counteracted as much as possible. For example, in the power converter as shown in FIG. 6, the post-stage circuit of the power converter is constituted of three BUCK circuits connected in parallel. The three BUCK circuits can be operated in the interleaving mode having unequal phase differences. For example, the output voltage of the BUCK circuit is 1.8V and the output power is 200 W, the operating principle of the interleaving mode having unequal phase differences is shown in FIGS. 16 and 17.

Figure 16:
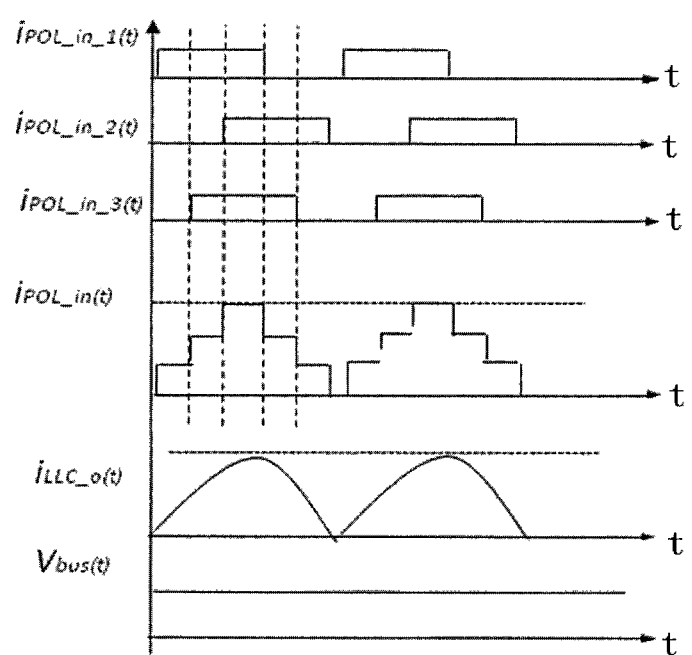
FIGS. 16 and 17 are waveform graphs of the plurality of post-stage circuits of a power converter according to an embodiment of the present disclosure which operate in interleaving mode having phase differences.

When the bus voltage output from the pre-stage circuit is Vbus(t)<3.6V and the duty cycle of the BUCK circuits is D>50%, and there are three BUCK circuits, wherein the relationships of the timing sequences of the driving signals of the switching devices S1, S2 and S3 in the BUCK circuits, the output current waveform of the LLC circuit and the bus voltage waveform are shown in FIG. 16: 1) the operating frequency of each of the BUCK circuits is twice the operating frequency of the LLC circuit; 2) if an initial phase of a driving signal for the semiconductor switch device of the pre-stage circuit is 0 degree, the initial phase of the driving signal $i_{POL\_in\_1}(t)$ of the switching device S1 in the first BUCK circuit is 0 degree, the initial phase of the driving signal $i_{POL\_in\_2}(t)$ of the switching device S2 in the second BUCK circuit is (1-D)*360 degrees, and the initial phase of the driving signal $i_{POL\_in\_3}(t)$ of the switching device S3 in the third BUCK circuit is (1-D)*180 degrees. If all the three conditions are satisfied, the profile and amplitude of the waveform of the input current $i_{POL\_in}(t)$ combined by the three BUCK circuits approximate to the waveform of the output current $i_{LLC\_o}(t)$ of the LLC circuit, desirable for counteracting the AC components in the output current of the LLC circuit and the input currents of the BUCK circuits.

Figure 17:
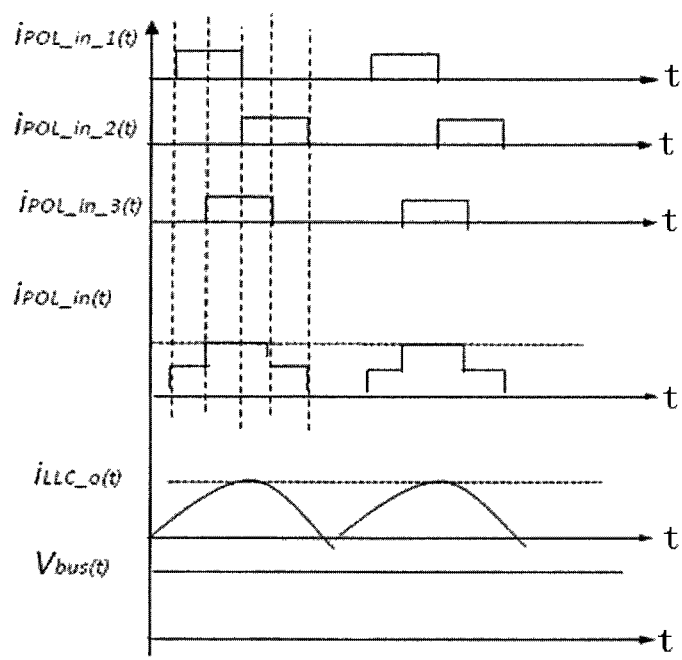

When the bus voltage output by the pre-stage circuit is 3.6≤Vbus(t)<7.2V and the duty cycle of the BUCK circuits is 50%≥D>25%, and there are three BUCK circuits, wherein the relationships of the timing sequences of the driving signals of the switching devices in the BUCK circuits, the output current waveform of the LLC circuit and the bus voltage waveform are shown in FIG. 17: 1) the operating frequency of each BUCK circuit is twice the operating frequency of the LLC circuit; 2) if an initial phase of a driving signal for the semiconductor switch device of the pre-stage circuit is 0 degree, the initial phase of the driving signal $i_{PoL\_in\_1}(t)$ of the switching device S1 in the first BUCK circuit is (0.5-D)*360 degrees, the initial phase of the driving signal $i_{POL\_in\_2}(t)$ of the switching device S2 in the second BUCK circuit is 180 degrees, and the initial phase of the driving signal $i_{POL\_in\_3}(t)$ of the switching device S3 in the third BUCK circuit is (1-D)*180 degrees. If all the three conditions are satisfied, the profile and amplitude of the waveform of the input current $i_{POL\_in}(t)$ combined by the three BUCK circuits approximate to the waveform of the output current $i_{LLC\_o}(t)$ of the LLC circuit, desirable for counteracting the AC components in the output current of the LLC circuit and input currents of the BUCK circuits.

Theoretically, if there are enough numbers of BUCK circuits, the current of the two stages of circuits can be totally the same, so that the AC components in the output current of the LLC circuit and the input currents of the BUCK circuits are totally counteracted.

Figure 18:
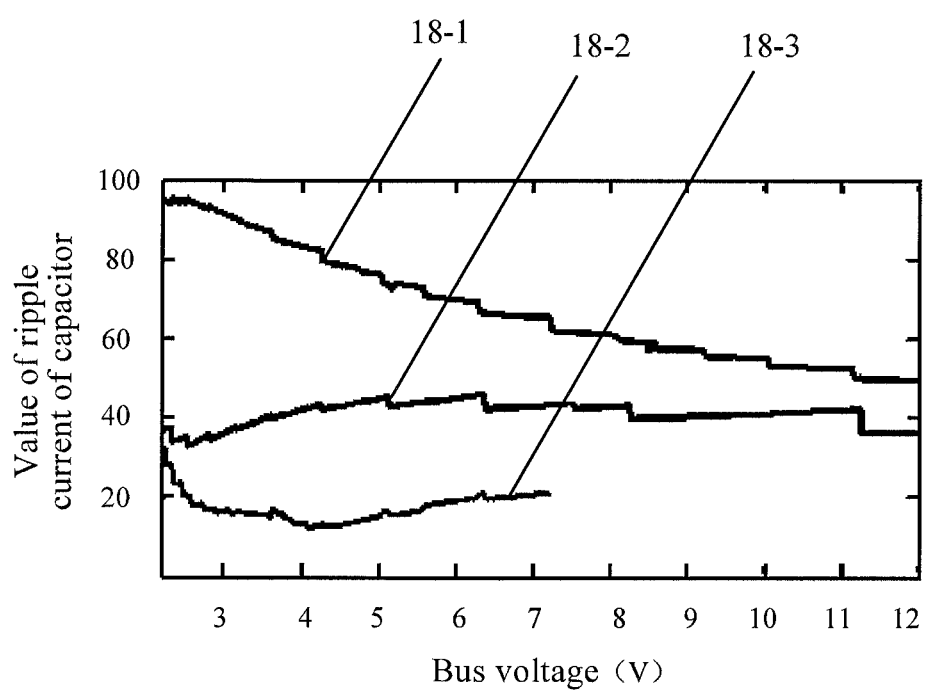
FIG. 18 is a waveform graph of the bus voltage output by the pre-stage circuit against the ripple current value of the capacitor.

It is assumed that, for example, the output voltage of the post-stage circuit is 1.8V and the output power is 200 W, and FIG. 18 shows the ripple current values on the output capacitor of the pre-stage circuit and the input capacitor of the post-stage circuit for different bus voltages. For the curve 18-1, the distance between the output capacitor C1 of the pre-stage circuit (for example, a LLC circuit) and the input capacitor C2 of the post-stage circuit (for example, a BUCK circuit) is far enough, so that the output current $i_{LLC\_o}$ of the pre-stage circuit almost just flows through the output capacitor C1, and the input current $i_{BUCK\_in}$ of the post-stage circuit almost just flows through the input capacitor C2. That is, the stray inductor between the output capacitor C1 of the pre-stage circuit, the input capacitor C2 of the post-stage circuit and the output capacitor C1 and the input capacitor C2 satisfy: k=0.99, q=0.99. The effective value of the current on the curve 18-1 is an effective value of the current of the output current $i_{LLC\_o}$ of the pre-stage circuit plus an effective value of the current of the input current $i_{BUCK\_in}$ of the post-stage circuit. The curve 18-2 or 18-3 shows another ideal situation, in which the output capacitor of the pre-stage circuit (for example, a LLC circuit) and the input capacitor of the post-stage circuit (for example, a BUCK circuit) are shared by the two stages of circuits, and the shared capacitors and the stray inductor satisfy: k=0.9, q=0.5. The effective value of the current of the curve 18-2 or 18-3 is an effective value of the current after the AC components in the output current $i_{LLC\_o}$ of the pre-stage circuit and the input current $i_{BUCK\_in}$ of the post-stage circuit are counteracted. The difference between the curves 18-2 and 18-3 lies in that in the curve 18-2, a plurality of post-stage circuits are connected in parallel to the output terminals of the pre-stage circuits, wherein the switches in the post-stage circuits are controlled in the same phase; while in the curve 18-3, a plurality of post-stage circuits are connected in parallel to the output terminals of the pre-stage circuits, wherein the switches in the post-stage circuits are controlled in multiple phases (unequal phases). It can be seen from FIG. 18 that when the output capacitor C1 and the input capacitors C2 are shared and the switches in the post-stage circuits are controlled in multiple phases, the ripple current value of the capacitor is minimum (as shown in FIG. 18-3).

Figure 19:
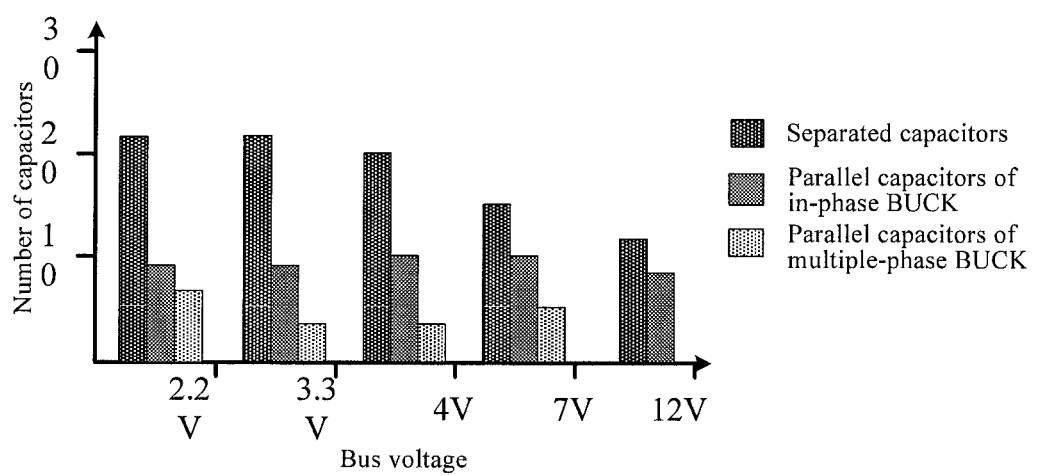
FIG. 19 is a relationship between the number of capacitors and the bus voltage corresponding to FIG. 18.

FIG. 19 shows the relationship between the number of capacitors and the bus voltages in corresponding situations. The number of capacitors is selected according to the limitation of 20 degrees of temperature rise for each capacitor and less than 1% of the voltage ripple of the bus voltage. Moreover, when the bus voltage is less than 6V, a GRM32ER60J107 capacitor can be adopted, and when the bus voltage is greater than 6V, a GRM32ER61C476 capacitor can be adopted. It can be seen from FIG. 19 that when the output capacitor C1 of the pre-stage circuit and the input capacitors C2 of the post-stage circuits are shared by the two stages of circuits and the switches in the post-stage circuits are controlled in multiple phases, the ripple current value of the capacitors is minimum and the number of capacitors can be minimum.

In the present embodiment, it provides a condition to be satisfied by the distance between the output capacitor of the pre-stage circuit (i.e. the first capacitor) and the input capacitor of the post-stage circuit (i.e. the second capacitor). When these conditions are satisfied, both of the output current of the pre-stage circuit and the input current of the post-stage circuit flow through the first capacitor and the second capacitor, and the AC components of the output current and the input current are at least partly counteracted on the first capacitor and the second capacitor, thus reducing the total volume, number, and even loss of the capacitors significantly. Moreover, in the present embodiment, it also provides the condition to be satisfied to counteract the current of the capacitors for a plurality of post-stage circuits connected in parallel.

Compared with the related art, the power converter disclosed by the present disclosure can effectively solve both of the problems of isolation and wide operating voltage, and take both of high efficiency and high power density into consideration. It can achieve better performance, high-frequency performance and higher power density for the point power supply. Moreover, the setting method and control method of the devices in the power converter provided by the present disclosure are also effective.

It should be noted that the above descriptions only illustrate exemplary embodiments and principles of the present disclosure. It will be appreciated by one skilled in this art that the present disclosure is not limited to the particular embodiments described herein, and various alterations, modifications and substitutions can be made without departing from the protection scope of the present disclosure. Therefore, although the present disclosure is described in detail with reference to the above embodiments, the present disclosure is not limited to those embodiments, and other equivalent embodiments can be included without departing from the scope of the present disclosure which is defined by the appended claims.

What is claimed is:

1. A power converter, comprising:
a pre-stage circuit, configured to receive an input voltage and convert the input voltage to a bus voltage; and
a plurality of post-stage circuits, connected in parallel to an output terminal of the pre-stage circuit, and configured to receive the bus voltage from the pre-stage circuit and each converts the bus voltage to an output voltage,
wherein the pre-stage circuit comprises a first capacitor disposed on an output side of the pre-stage circuit, and each of the post-stage circuits comprises a second capacitor disposed on an input side of the post-stage circuit,
wherein the power converter comprises an inductor disposed between the first capacitor and the second capacitor, and
wherein the second capacitor is connected in series with the inductor to define a first series branch, the first series branch is connected in parallel across the first capacitor, and a distance between the first capacitor and the second capacitor is set to satisfy both of following conditions:
at a frequency of an output current of the pre-stage circuit, an absolute value of an impedance of the first series branch is less than or equal to $$\frac{k}{1-k}$$

times of an absolute value of an impedance of the fir capacitor and greater than or equal to $$\frac{1-k}{k}$$

times of the absolute value of the impedance of the first capacitor, wherein $0.5 \leq k \leq 1$;
the impedance of the first series branch is capacitive at the frequency of the output current.

2. The power converter according to claim 1, wherein a number of the pre-stage circuit is more than one, and input terminals of the pre-stage circuits are connected in parallel.

3. The power converter according to claim 1, wherein the input voltage is greater than 10 times of the output voltage.

4. The power converter according to claim 1, wherein the input voltage ranges from 10V to 500V.

5. The power converter according to claim 1, wherein the output voltage ranges from 0.5V to 3.3V.

6. The power converter according to claim 1, wherein the pre-stage circuit is an isolation circuit or a non-isolation circuit, and each of the post-stage circuits is a non-isolation circuit.

7. The power converter according to claim 1, wherein the pre-stage circuit is any one of a half-bridge circuit, a full-bridge circuit, a forward circuit, a flyback circuit, a BUCK circuit, a LLC resonant circuit or a LC circuit, and each of the post-stage circuits is any one of a boost circuit, a BUCK circuit and a BUCK-boost circuit.

8. The power converter according to claim 1, wherein the first capacitor and the second capacitor are a capacitor.

9. The power converter according to claim 1, wherein the first capacitor comprises a plurality of capacitors connected in parallel or the second capacitor comprises a plurality of capacitors connected in parallel.

10. The power converter according to claim 1, wherein the inductor is a parasitic inductor depending on a set distance between the first capacitor and the second capacitor.

11. A power converter, comprising:
a pre-stage circuit, configured to receive an input voltage and convert the input voltage to a bus voltage; and
a plurality of post-stage circuits, connected in parallel to an output terminal of the pre-stage circuit, and configured to receive the bus voltage from the pre-stage circuit and each converts the bus voltage to an output voltage,
wherein the pre-stage circuit comprises a first capacitor disposed on an output side of the pre-stage circuit, and each of the post-stage circuits comprises a capacitor disposed on an input side of the post-stage circuit,
wherein the power converter comprises an inductor disposed between the first capacitor and the second capacitor, and
wherein the first capacitor is connected in series with the inductor to define a second series branch, the second series branch is connected in parallel across the second capacitor, and a distance between the first capacitor and the second capacitor is set to satisfy both of following conditions:
at a frequency of an input current frequency of a post-stage circuit, an absolute value of an impedance of the second series branch is less than or equal to $$\frac{q}{1-q}$$

times of an absolute value of an impedance of the second capacitor, and greater than or equal to $$\frac{1-q}{q}$$

times of the absolute value of the impedance of the second capacitor, wherein $0.5 \leq q \leq 1$;
the impedance of the second series branch is capacitive at the frequency of the input current.

12. The power converter according to claim 1, wherein the plurality of post-stage circuits are connected to the output terminal of the pre-stage circuit in an interleaving mode.

13. The power converter according to claim 12, wherein the interleaving mode has unequal phase differences.

14. The power converter according to claim 1, wherein the plurality of post-stage circuits comprises a first post-stage circuit, a second post-stage circuit and a third post-stage circuit, wherein when a duty cycle of the first post-stage circuit, the second post-stage circuit and the third post-stage circuit is D>50%, if an initial phase of a driving signal for the semiconductor switch device of the pre-stage circuit is 0 degree, an initial phase of a driving signal for the first post-stage circuit is 0 degree, an initial phase of a driving signal for the second post-stage circuit is (1−D)*360 degrees, and an initial phase of a driving signal for the third post-stage circuit is (1−D)*180 degree; and each working frequency of the first, the second and the third post-stage circuits is two times of a working frequency of the pre-stage circuit; and when a duty cycle of the first post-stage circuit, the second post-stage circuit and the third post-stage circuit is 50%≥D>25%, if the initial phase of a driving signal for the semiconductor switch device of the pre-stage circuit is 0 degree, the initial phase of the driving signal for the first post-stage circuit is (0.5−D)*360 degrees, the initial phase of the driving signal for the second post-stage circuit is 180 degrees, and the initial phase of the driving signal for the third post-stage circuit is (1−D)*180 degrees; and each working frequency of the first, the second and the third post-stage circuits is two times of a working frequency of the pre-stage circuit.

15. The power converter according to claim 1, wherein output terminals of the post-stage circuits are connected in parallel, for outputting an output voltage to supply power to a load.

16. The power converter according to claim 1, wherein output terminals of the pre-stage circuit are electrically connected with a load, to supply the bus voltage as power to the load.

17. The power converter according to claim 1, wherein the power converter comprises a plurality of loads, each of the loads is electrically connected with an output terminal of one of the plurality of post-stage circuits correspondingly.

18. The power converter according to claim 1, further comprising molding material, the molding material covers the pre-stage circuit and the plurality of post-stage circuits.

19. The power converter according to claim 11, wherein the first capacitor and the second capacitor are a capacitor.

20. The power converter according to claim 11, wherein the first capacitor comprises a plurality of capacitors connected in parallel or the second capacitor comprises a plurality of capacitors connected in parallel.

* * * * *